United States Patent Office 2,922,796
Patented Jan. 26, 1960

2,922,796

YELLOW SULFONAMIDE DYESTUFF

John R. Adams, Jr., Summit, and Victor S. Salvin, New Providence, N.J., assignors to Celanese Corporation of America, New York, N.Y., a corporation of Delaware No Drawing. Application May 17, 1954
Serial No. 430,410

2 Claims. (Cl. 260—397.7)

This invention relates to dyeing and relates more particularly to the dyeing of organic derivative of cellulose textile material with yellow dyestuffs.

It is an object of this invention to provide novel yellow dyestuffs for textile materials.

A further object of this invention is the provision of novel dispersed cellulose acetate dyestuffs, which, when dyed on cellulose acetate or other organic derivative of cellulose, yield colored materials of improved washfastness.

It is another object of this invention to provide a novel method for the dyeing of textile materials to produce colored materials of improved washfastness.

Other objects of this invention will be apparent from the following detailed description and claims.

In accordance with this invention there are produced novel yellow dyestuffs, which comprise a 4-amino-3-nitrobenzenesulfonamide in which the nitrogen atoms of both the amino and sulfoamide groups carry aryl substituents and in which there is an alcoholic hydroxyl substituent. The aryl groups on the amino and sulfonamide nitrogens may be unsubstituted or may carry substituents such as alkoxy, alkoxyalkoxy, halogen, acylamino, hydroxyl or acyl, while the alcoholic hydroxyl substituent may be present on the sulfonamide nitrogen or on one or both of the aryl groups.

In one convenient process for the production of the novel dyestuffs of this invention there is produced first an alcoholic hydroxyl-containing N-aryl-4-halo-3-nitrobenzenesulfonamide, as by reacting a 4-chloro, or bromo-, nitrobenzene sulfonyl halide, e.g. a chloride or bromide, with an aromatic amine containing an alcoholic hydroxyl group, such as an N-aryl N-hydroxyaliphatic amine, e.g. phenylethanolamine. The resulting compound is then reacted with a monocyclic aromatic amine, e.g. aniline, in the presence of an acid-binding agent to produce the dyestuff. Alternatively, the dyestuffs of this invention may be produced by reacting the 4-halo-3-nitrobenzenesulfonyl halide with an aromatic amine containing no alcoholic hydroxyl group, e.g. aniline, to produce an N-aryl 4-halo-3-nitrobenzene sulfonamide free of hydroxyl groups. This compound is then reacted with an aromatic amine containing an alcoholic hydroxyl group, e.g. m-hydroxyethylphenyl amine, in the presence of an acid-binding agent to produce the dyestuff. On the other hand, both of the aromatic amines used in the successive steps of the reaction may contain alcoholic hydroxyl groups. For example, phenylethanolamine may be used in the first stage of the reaction and m-hydroxyethylphenyl amine may be used in the second stage.

Examples of suitable aromatic amines, free of hydroxyl groups, which may be used in making the dyestuffs of this invention are aniline, toluidine, naphthylamine, biphenylamine, o-, m-, or p-acetylaniline, aminoacetanilide, chloroaniline and aminophenol. Examples of suitable hydroxyl-containing aromatic amines which may be employed in making the dyestuffs of this invention are secondary N-aryl N-hydroxyaliphatic amines, such as N-phenyl N-β-hydroxyethyl amine, N-phenyl N-α-hydroxyethyl amine, N-phenyl-N-β-hydroxypropyl amine, N-ethoxyphenyl N-β-hydroxyethylamine, N-ethoxyethoxyphenyl-N-γ-hydroxypropyl amine, N-phenyl-N-β-hydroxybutyl amine, or N-chlorophenyl-N-β-hydroxypropyl amine, or primary aromatic amines carrying hydroxyaliphatic substituents on the aromatic ring, such as o-, m- or p-hydroxyethyl aniline, o-, m- or p-hydroxyethyl toluidine, o-, m-, or p-hydroxypropyl aniline, or o-, m- or p-hydroxyethoxy aniline.

Another method for the preparation of the dyestuffs of this invention involves the reaction of a 4-arylamino-3-nitro-benzenesulfonamide having an aryl group on the sulfonamide nitrogen with a compound capable of introducing alcoholic hydroxyl groups therein. Suitable compounds capable of introducing alcoholic hydroxyl groups are, for example, alkylene oxides, such as ethylene oxide, or chlorohydrins, such as ethylene chlorohydrin. Thus, 4-phenylamino-3-nitro-benzenesulfonanilide, otherwise known as 2-nitrodiphenylamine-4-sulfonanilide, may be reacted with ethylene oxide to cause the substitution of a hydroxyethyl or hydroxyethoxyethyl radical on the nitrogen of the sulfonamide group.

Examples of dyestuffs produced in accordance with this invention are 2-nitro-diphenylamine-4-sulfon (N-β-hydroxyethyl) anilide, 4'-ethoxy-2-nitro-diphenylamine-4-sulfon-(N-β-hydroxyethyl) anilide, 4'-hydroxyethyl-2-nitrodiphenylamine-4-sulfon-(p-methyl) anilide, 4'-ethoxy-2-nitrodiphenylamine-4-sulfon-(m-hydroxyethyl) anilide, and 4'-hydroxyethyl-2-nitrodiphenylamine-4-sulfon (N-β-hydroxyethyl) anilide. A preferred class of dyestuffs comprises those of the formula

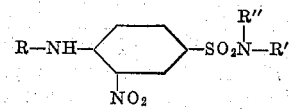

in which R and R' are monocyclic aryl hydrocarbon radicals and R'' is a lower hydroxyalkyl radical. One highly suitable member of this class is the previously mentioned 2-nitro-diphenylamine-4-sulfon-(N-β-hydroxyethyl) anilide.

The novel dyestuffs of this invention have a substantive affinity for cellulose acetate or other organic derivative of cellulose materials. In addition, these dyestuffs yield dyeings of good washfastness, which washfastness may be improved to a substantial degree by reacting the dye in the fiber with heat-curable amidogen-formaldehyde condensates, preferably in the presence of an acidic catalyst, in accordance with the procedure disclosed in the copending application of Conciatori et al., Serial No. 430,411, now U.S. Patent No. 2,880,052, filed on even date herewith.

The novel dyestuffs of this invention may be applied to the cellulose acetate or other organic derivative of cellulose acetate in any convenient manner. Preferably, however, they are applied in the form of aqueous dyebaths comprising dispersions of the water-insoluble dyestuffs in water containing a suitable dispersing agent, such as Turkey red oil, a sulfonated alkyl aryl compound such as a sulfonated alkyl naphthalene or alkyl benzene, a lignosulfonate, a sulfonated formaldehyde-naphthalene condensation product, a fatty alcohol sulfate, a soap, or a non-ionic condensation product of ethylene oxide and a fatty alcohol, acid or amide. The aqueous dispersion is preferably applied at an elevated temperature, e.g. 65° to 95° C. or higher. It is sometimes desirable to incorporate into the aqueous dyebath a swelling agent for the cellulose acetate or organic derivative of cellulose material, e.g. the monobutyl ether of diethylene glycol or the monomethyl ether of ethylene glycol. The dyestuffs of this invention may also be applied by other methods; for example they may be applied in the form of water solutions thereof in suitable solvents, such as methyl alcohol, gamma valerolactone or diacetone alcohol. These dyestuffs may also be incorporated into a solution of the cellulose acetate or other organic derivative of cellulose material in a volatile solvent and the resulting colored solution may thereafter be formed into the desired shape, e.g. into a film or filament, and the solvent evaporated.

The following examples are given to illustrate the invention further.

*Example I*

25 parts by weight of N-phenyl-N-beta-hydroxyethyl amine are added dropwise to a solution of 21 parts by weight of 4-chloro-3-nitrobenzene sulfonyl chloride in 317 parts by weight of acetone while the solution is stirred, the rate of addition being such that the temperature of the reaction mixture does not rise above 32° C. After the mixture has been allowed to react for 3 hours at a temperature of 25–30° C., while stirring, it is diluted with 2,000 parts by weight of water and acidified with hydrochloric acid to dissolve any unreacted amine. The reaction product separates from the reaction mixture on acidification in the form of an oil which quickly solidifies. After the reaction product has been isolated, by filtration, it is washed with water and dried. 26.8 parts by weight of a product melting at 100° C. and comprising 4-chloro-3-nitrobenzenesulfon-(N-$\beta$-hydroxyethyl) anilide are obtained.

*Example II*

8.4 parts by weight of 4-chloro-3-nitrobenzenesulfonyl chloride, 0.5 part by weight of the wetting agent "Nekal BX-76" (diisobutyl naphthalene sulfonic acid) and 30 parts by weight of water are thoroughly milled together. 20 parts of water are then added, following which the mixture is made just alkaline to Brilliant Yellow indicating paper by the addition of sodium bicarbonate and then heated to 70° C. with agitation. 6 parts by weight of N-phenyl-N-$\beta$-hydroxyethylamine are added over a period of 20 minutes in small increments to the heated stirred mixture. After each increment is added, sufficient sodium bicarbonate is added to adjust the pH of the mixture to alkalinity to Brilliant Yellow. Thereafter the reaction mixture is stirred for 3 hours at 70° C. and then cooled, diluted with 300 parts by weight of water, and filtered to separate out the solid reaction product, which is washed thoroughly with water and dried. 8.9 parts by weight of a material melting at 89 to 98° C. and comprising 4-chloro-3-nitrobenzenesulfon-(N-beta-hydroxyethyl) anilide is obtained. This product may be purified by crystallization from ethanol, whereupon a material melting at 100 to 101° C. is obtained.

*Example III*

A mixture of 7 parts by weight of 4-chloro-3-nitrobenzenesulfon-(N-beta-hydroxyethyl) anilide, obtained according to Example I or II, 5 parts by weight of aniline, 2 parts by weight of sodium carbonate and 100 parts by weight of water is heated with stirring at reflux temperature for 20 hours. The reaction mixture is cooled and then diluted with 500 parts by weight of water containing a small amount of hydrochloric acid, sufficient to dissolve out the unreacted aniline. The resulting solid product is washed thoroughly with water and dried. 7.3 parts by weight of a solid yellow product, comprising 2-nitrodiphenylamine-4-sulfon-(N-beta-hydroxyethyl) anilide is obtained. This dyestuff, which sinters at 124° C. and melts at 129 to 133° C., is then purified by crystallization from ethanol. The purified material melts at 135 to 136° C.

*Example IV*

The process of Example III is repeated except that an equivalent amount of p-phenetidine is substituted for the aniline. The purified orange-yellow dyestuff produced in this manner, i.e. 4'-ethoxy-2-nitrodiphenylamine-4-sulfon-(N-beta-hydroxyethyl) anilide, melts at 120 to 123° C.

*Example V*

The dyestuff produced according to Example III is applied in an aqueous dyebath to a fabric composed of fibers of acetone-soluble cellulose acetate in the following manner:

1 liter of the dispersing agent known as "Quaker 2800" (comprising sulfonated castor oil) is mixed with 250 grams of potassium pyrophosphate, 500 ml. of a 10% solution of sodium oleate, and 1750 ml. of water. 100 ml. of this mixture is mixed with 1 gram of the dyestuff of Example III and hot water is added portionwise until the total volume is 7 liters. 100 grams of the fabric is dyed in this bath, while agitating, at 85° C. for one hour. The fabric is then rinsed and dried. A well-dyed yellow fabric, which is fast to light, is obtained.

*Example VI*

To the dyed fabric of Example V there is applied, by padding from an aqueous solution, 5% based on the weight of the fabric of N,N'-dimethoxymethyl ethylene urea and 0.5% based on the weight of the fabric of an acidic catalyst, specifically the mixture of organic amine hydrochloride and formaldehyde known as "Catalyst G–8." The fabric is dried and then cured by heating it in an oven at 150° C. for 15 minutes. The fabric is then subjected to the #3 A.A.T.C.C. washfastness test, involving washing at 160° F. Only 5.4% of the dyestuff originally present in the dyed fabric is lost. In contrast, the untreated dyed fabric of Example III loses 23.5% of the dyestuff when subjected to the same test.

While this invention has been illustrated specifically in connection with the dyeing of textile material cellulose acetate, it may be applied to the dyeing of other organic derivative of cellulose textile materials such as other cellulose esters, e.g. cellulose propionate, cellulose butyrate, cellulose acetate butyrate, cellulose acetate propionate, or cellulose ethers, such as ethyl or benzyl cellulose. The dyestuffs of this invention may also be applied to other textile materials, such as polyamides, e.g. nylon, polyesters such as polyethylene terephthalate or polymers or copolymers of acrylonitrile.

It is to be understood that the foregoing detailed description is given merely by way of illustration and that many variations may be made therein without departing from the spirit of our invention.

Having described our invention, what we desire to secure by Letters Patent is:

1. 2 - nitro - diphenylamine - 4 - sulfon - (N - $\beta$ - hydroxyethyl) anilide.
2. Process which comprises reacting 4-chloro-3-nitrobenzenesulfonyl chloride with N-phenyl-N-beta-hydroxyethyl amine to produce 4-chlor-3-nitrobenzenesulfon-(N-beta-hydroxyethyl) anilide and reacting the latter compound with aniline to produce 2-nitro-diphenylamine-4-sulfon-(N-beta-hydroxyethyl) anilide.

References Cited in the file of this patent

UNITED STATES PATENTS

| | | |
|---|---|---|
| 2,364,726 | Landolt et al. | Dec. 12, 1944 |
| 2,416,884 | Schreiber et al. | Mar. 4, 1947 |
| 2,506,224 | Kopp et al. | May 2, 1950 |
| 2,595,359 | Hieserman | May 6, 1952 |
| 2,725,390 | Fogelman | Nov. 29, 1955 |